Dec. 6, 1938.  W. E. JOHNSTON  2,138,862
UTILITY TOOL
Filed Dec. 22, 1936
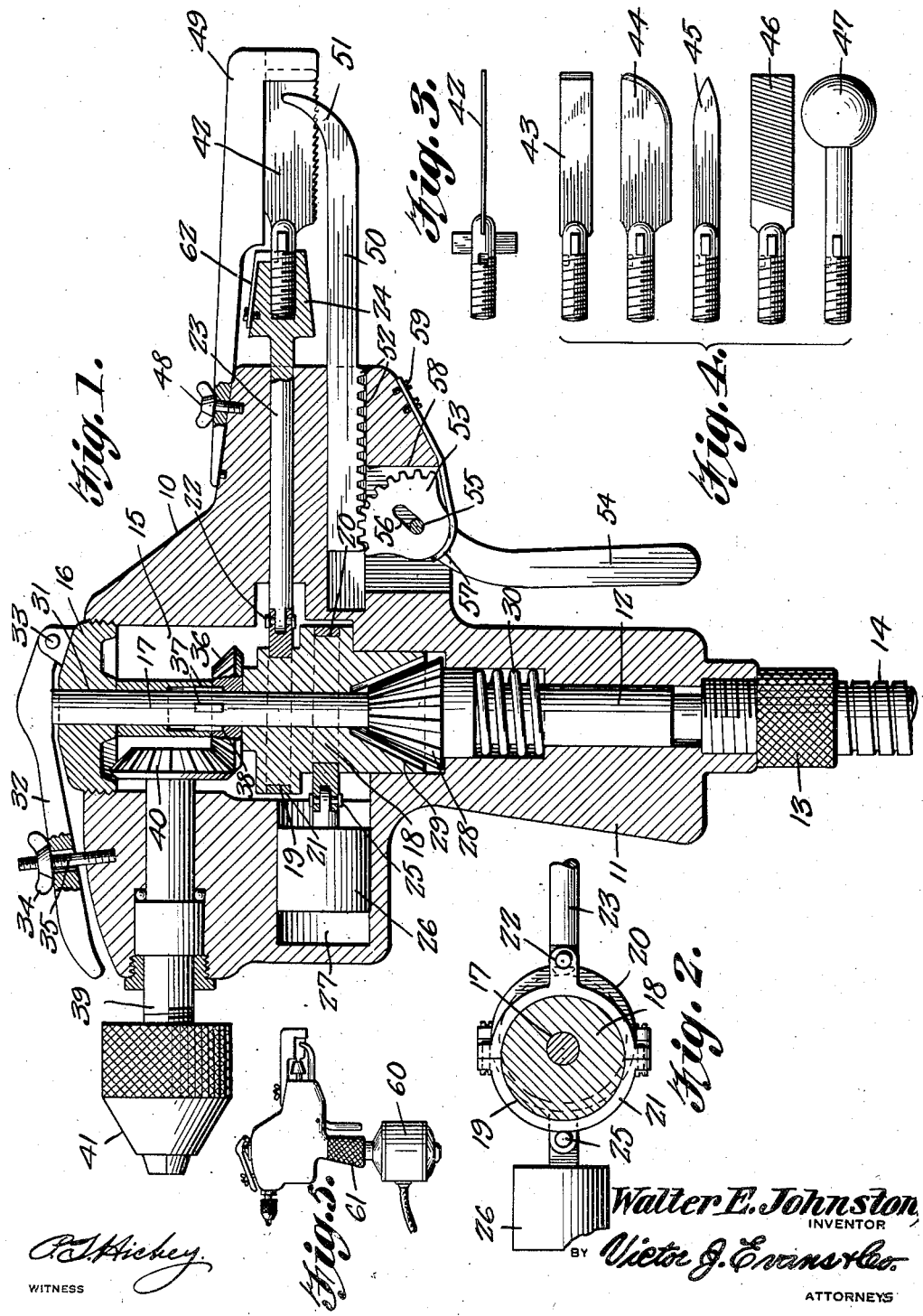

Patented Dec. 6, 1938

2,138,862

UNITED STATES PATENT OFFICE 2,138,862

UTILITY TOOL

Walter E. Johnston, Vicksburg, Miss.

Application December 22, 1936, Serial No. 117,233

3 Claims. (Cl. 74—44)

The invention relates to a utility tool and more especially to motor operated combination tools.

The primary object of the invention is the provision of a tool of this character, wherein the same has a two fold purpose, namely, a surgical or orthopedic instrument and a mechanical tool susceptible of being converted for drilling, sawing, filing, etching as well as for bone cutting and plaster cast cutting.

Another object of the invention is the provision of a tool of this character, wherein the drill chuck for use in drilling is operated independently of a reciprocating shank, the latter being adapted for the holding of different kinds of tools, such as a saw blade, chisel, knife, file, etc., and these being driven from a source of power such as an electric motor.

A further object of the invention is the provision of a tool of this character, wherein the same is compact so that it can be readily and easily handled and is susceptible for various uses, being novel in construction and in the arrangement thereof.

A further object of the invention is the provision of a tool of this character, which is simple in its construction, thoroughly reliable and efficient in operation, handy for use in drilling, sawing, filing, etching or for other purposes, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an enlarged vertical sectional view through a tool constructed in accordance with the invention.

Figure 2 is a fragmentary transverse sectional view thereof.

Figure 3 is a top edge view of a saw blade for use in the tool.

Figure 4 is an exploded plan view showing a group of other attachments for use in the tool.

Figure 5 is a side elevation of a slight modification of tool.

Similar reference characters indicate corresponding parts through the several views in the drawing.

Referring to the drawing in detail, the tool comprises a housing body 10 which at the under side thereof has depending therefrom a pistol grip or handle 11 through which extends a drive spindle 12 adapted for slidable coupling at 13 with a flexible driving connection from a source of power, the driving connection being not shown and is confined within a flexible tubing 14 of the required length so that the tool may be manipulated and positioned to the work to be operated upon thereby. The spindle 12 is extended upwardly into a chamber 15 interiorly of the body 10. This chamber 15 opens through the top of the body which has fitted thereto a closure cap 16 for the upper open end of the said chamber 15. The spindle 12 has the upper reduced end portion 17 and loose upon the latter is the double eccentric 18, the eccentrics 19 and 20, respectively, of the latter are reversely set to each other and are embraced by straps 21, one being pivoted at 22 to a reciprocatory shank 23 operating through the body 10 at one side thereof. This shank 23 carries a socketed head 24 at its outer end for a purpose presently described.

The other strap 21 has pivoted at 25 thereto a piston 26 reciprocatingly fitted within a cylinder 27 therefor as formed interiorly of the body 10 diametrically opposite to the shank 23, the purpose of the piston 26 being to reduce vibration in the operation of the shank 23 as well as effecting a counterbalance thereto.

The spindle 12 is formed with a male clutch part 28 and the double eccentric 18 is formed with a female clutch part 29 companion to the clutch part 28 so that the double eccentric 18 can be locked upon the reduced portion 17 of the spindle 12 to turn therewith. The clutch part 28 is forced into clutching engagement with the part 29 under the influence of a coiled expansion spring 30 surrounding the spindle 12 and seated within the pistol grip or handle 11 on the body 10. The portion 17 of the spindle 12 works through a center opening 31 in the cap 16 to be engaged by a lever 32 pivoted at 33 on the said cap 16 and this lever is susceptible of adjustment by a winged nut 34 threaded on a stud bolt 35 fixed in the body 10. When the nut 34 is screwed inwardly on the bolt 35 the lever 32 is depressed and acting on the portion 17 of the spindle 12 unclutches the clutch parts 28 and 29 from each other thereby freeing the double eccentric 18 to have the same loose from the portion 17 of said spindle. When the double eccentric 18 is loose on the portion 17 of the spindle 12, the shank 23 and the piston 26 are passive or inactive.

Above the double eccentric 18 and loose on the portion 17 of the spindle 12 is a beveled gear 36 while fixed to the said portion 17 of the spindle is a clutch part 37 companion to a clutch face 38 on the gear 36 so that the latter can be locked with the portion 17 of the spindle. This locking of the gear 36 takes place when the clutch parts 28 and 29 are separated from each other freeing the double eccentric 18 from said portion 17 of the spindle 12. Journaled in the body 10 at that side opposite the shank 23 is a rotary drill shaft 39 which at its inner end is formed with the beveled gear 40 meshing with the gear 36 and at the outer end carries a drill bit chuck 41 of conventional kind. Thus when the gear 36 is clutched to the portion 17 of the pintle 12, the drill shaft 39 operates for drilling purposes.

Adapted for fitting in the head 24 of the shank 23 are the saw blade 42, chisel 43, knife 44, pick 45, file 46 and massage applicator 47, respectively.

Detachably fitted to the body 10 by a winged screw 48 is a guard 49 for the saw blade 42 and this guard overhangs the heel edge of the latter when in use.

Below the shank 23 and slidably fitted in the body 10 is a gauge 50 having the substantially V-shaped forked outer end 51 through which works the saw blade 42 when in action while at the inner end of the said gauge 50 is a toothed rack 52 meshing with a toothed sector 53 of a throw finger or arm 54, the sector 53 being displaceably engaged on a turning arbor 55 which lies within an elongated slot 56 in the said sector 53 while acting against the sector 53 is a leaf spring 57 which holds the sector normally enmesh with the rack 52 yet by pulling upon the finger or arm 54 the said sector 53 may be moved out of engagement with the rack 52 so that the gauge 50 can be removed from the body 10 when the use of the gauge is unnecessary. The sector 53 occupies a clearance 58 therefor provided in the body 10, the spring being fixed at 59 to the said body of the tool.

In Figure 5 of the drawing there is shown a modified form of tool wherein an electric motor 60 has direct coupling with the grip or handle 61 similar to the grip or handle 11 and this motor is the power source for the operation of the tool.

The head 24 on the shank 23 carries a spring latch 62 for engaging the saw blade 42 or the other elements 43, 44, 45, 46 and 47 for the fastening thereof attached to the tool.

When the shank 23 is reciprocated the drill shaft 39 is still or passive and vice versa.

The tool is handy for mechanics and also is serviceable for surgical or orthopedic work as well as for cutting plaster casts to remove the same from a patient. The gauge 50 when in use limits the extent of cutting action of the tool when the saw 42 is operated while the guard protects an operator from injury when the tool is in use for cutting, sawing or otherwise.

What is claimed is:

1. A tool of the character described comprising a housing body having an external hand grip, a power spindle rotatably and slidably fitting said hand grip, driven members in said body and extended oppositely thereto, releasable connections between the spindle and said members, and a control lever exteriorly of the body and active upon the driving spindle for alternately releasing the connections between said spindle and the driven members.

2. A tool of the character described comprising a housing body having an external hand grip, a power spindle rotatably and slidably fitting said hand grip, driven members in said body and extended oppositely thereto, releasable connections between the spindle and said members, a control lever exteriorly of the body and active upon the driving spindle for alternately releasing the connections between said spindle and the driven members, and means for holding the control lever in one set position.

3. A tool of the character described comprising a housing body having an external hand grip, a power spindle rotatably and slidably fitting said hand grip, driven members in said body and extended oppositely thereto, releasable connections between the spindle and said members, a control lever exteriorly of the body and active upon the driving spindle for alternately releasing the connections between said spindle and the driven members, means for holding the control lever in one set position, and means active upon the spindle for holding the same slidably tensioned.

WALTER E. JOHNSTON.